(12) United States Patent
Pahwa et al.

(10) Patent No.: US 10,416,895 B2
(45) Date of Patent: Sep. 17, 2019

(54) STORAGE DEVICES MANAGING DUPLICATED DATA BASED ON THE NUMBER OF OPERATIONS

(71) Applicant: Samsung Electronics Co., Ltd., Suwon-si, Gyeonggi-do (KR)

(72) Inventors: Shiva Pahwa, Hwaseong-si (KR); Alex Mohandas, Hwaseong-si (KR)

(73) Assignee: Samsung Electronics Co., Ltd. (KR)

( * ) Notice: Subject to any disclaimer, the term of this patent is extended or adjusted under 35 U.S.C. 154(b) by 82 days.

(21) Appl. No.: 15/840,036

(22) Filed: Dec. 13, 2017

(65) Prior Publication Data
US 2018/0232144 A1    Aug. 16, 2018

(30) Foreign Application Priority Data
Feb. 10, 2017    (KR) .................. 10-2017-0018816

(51) Int. Cl.
*G06F 3/06* (2006.01)
*G06F 12/02* (2006.01)

(52) U.S. Cl.
CPC ............. *G06F 3/061* (2013.01); *G06F 3/064* (2013.01); *G06F 3/065* (2013.01); *G06F 3/0616* (2013.01); *G06F 3/0619* (2013.01); *G06F 3/0653* (2013.01); *G06F 3/0679* (2013.01); *G06F 3/0688* (2013.01); *G06F 12/0246* (2013.01); *G06F 12/0284* (2013.01); *G06F 2212/2022* (2013.01); *G06F 2212/7201* (2013.01); *G06F 2212/7211* (2013.01)

(58) Field of Classification Search
CPC ............ G06F 12/0246; G06F 12/1009; G06F 2212/2022; G06F 3/061; G06F 3/0616; G06F 3/0683; G06F 3/0688; G06F 2212/205; G06F 2212/7201; G06F 2212/7204; G06F 2212/7211; G06F 3/0679
See application file for complete search history.

(56) References Cited

U.S. PATENT DOCUMENTS 8,200,925 B2    6/2012  Oh
8,332,576 B2 *  12/2012 Chu .................... G06F 12/0246
                                                    711/103
8,667,215 B2    3/2014  Marotta et al.
8,825,941 B2    9/2014  Moshayedi
(Continued)

OTHER PUBLICATIONS

Agrawal, Nitin, "Design Tradeoffs for SSD Performance", Proceedings of the USENIX Technical Conference, Jun. 2008, 14 pages.

*Primary Examiner* — Reginald G Bragdon
*Assistant Examiner* — Thanh D Vo
(74) *Attorney, Agent, or Firm* — Myers Bigel, P.A.

(57) ABSTRACT

A storage device may include one or more nonvolatile memory devices and a controller. The nonvolatile memory devices may be configured to store target data. When the number of operations which is performed on the target data is equal to or greater than a first reference value, the controller may be configured to store duplicated data, which is identical to some or all portions of the target data, in the nonvolatile memory devices. When the number of operations performed on the target data becomes equal to or smaller than a second reference value after the duplicated data is generated, the controller may be configured to invalidate the duplicated data.

19 Claims, 14 Drawing Sheets

(56) References Cited

U.S. PATENT DOCUMENTS

| | | |
|---|---|---|
| 9,223,693 B2 | 12/2015 | Sinclair |
| 9,400,710 B2 | 7/2016 | Shalvi et al. |
| 2015/0370670 A1 | 12/2015 | Lu |
| 2016/0188424 A1 | 6/2016 | Walls |
| 2016/0225461 A1 | 8/2016 | Tuers et al. |
| 2017/0199680 A1* | 7/2017 | Li .................. G06F 3/0616 |

* cited by examiner

STORAGE DEVICES MANAGING DUPLICATED DATA BASED ON THE NUMBER OF OPERATIONS

CROSS-REFERENCE TO RELATED APPLICATION

This U.S. non-provisional patent application claims priority under 35 U.S.C. § 119 to Korean Patent Application No. 10-2017-0018816, filed on Feb. 10, 2017, in Korean Intellectual Property Office, the disclosure of which is incorporated herein by reference in its entirety.

FIELD

The present disclosure relates to an electronic device, and more particularly, relates to configurations and operations of a storage device.

BACKGROUND

Various types of electronic devices are being used these days. An electronic device provides its own functions according to operations of electronic circuits included therein. An electronic circuit of the electronic device may perform a specific function, or may perform multiple functions in parallel while communicating with other electronic circuit.

A storage device is an electronic device. The storage device provides a storage service to a user by storing or outputting data. For example, the storage device may store or output data according to operations of memory elements and control circuits included therein.

While requirement for an enhanced capacity and fast data processing of a storage device increases, various issues relating with safe and reliable data communication have been discussed. For example, rapid data processing (i.e., high performance) may be beneficial for "hot data" which is frequently accessed by a user requires, but the lifespan and reliability of the storage device may be deteriorated in proportion to the access frequency. Thus, it may be beneficial to secure reliability of the storage device while improving performance of the storage device.

SUMMARY

Example embodiments of the present disclosure may provide configurations and operations of a storage device for efficient managing of a memory lifespan while rapidly outputting target data which is frequently accessed.

Some example embodiments may provide a storage device which includes one or more nonvolatile memory devices and a controller.

In some example embodiments, the nonvolatile memory devices may include a first memory area which is configured to store target data. The controller may monitor the number of operations which is performed on the target data. When the number of operations performed on the first target data is equal to or greater than a first reference value, the controller may duplicate the first target data and store the duplicated data in a second memory area of the nonvolatile memory devices. At least a portion of the duplicated data may be identical to the first target data. The first target data and the second duplicated data may be accessed in a parallel to read out a first portion of the first target data and a first portion of the duplicated data. The first portion of the first target data and the first portion of the duplicated data may be combined to form a complete data set which is identical to the first, target data. The second portion of the first target data and the second portion of the duplicated data may not need to be read out. The first portion of the first target data and the first portion of the duplicated data may be called as second target data. When the number of operations performed on the second target data becomes equal to or smaller than a second reference value after storing the duplicated data in the second memory area, the controller may invalidate the duplicated data of the second memory area. After invalidating the duplicated data, the controller may access the first target data.

According to example embodiments, when the number of operations performed on the first target data is equal to or greater than a first reference value, the controller may duplicate the first target data, and the duplicated data may be stored in a different memory device. The controller may access both the first target data and the duplicated data in parallel in response to a read request for getting a complete data set. When the number of operations performed on the first target data and the duplicated data becomes equal to or smaller than a second reference value after the duplicated data is generated, the controller may output the first target data only in response to a read request for getting the complete data set.

According to example embodiments, by accessing both the first target data and the duplicated data in parallel, overall read out time may be reduced to half because read out time for the first target data and the duplicated data may be half of the time required to read out complete data set from the first target date, and thus overall performance of the storage device may be improved. Furthermore, the operations performed on the memory device may be distributed into several memory areas depending on the number of the duplicated data. The reliability and lifespan of the storage device may be improved, and thus an error and failure due to read disturbance may be reduced.

BRIEF DESCRIPTION OF THE DRAWINGS

Some example embodiments will be described below in more, detail with reference to the accompanying drawings. The example embodiments may, however, be embodied in different forms and should not be constructed as limited to the following example embodiments set forth herein. Rather, these example embodiments are provided so that the present disclosure will be thorough and complete, and will fully convey the scope of the present invention to those skilled in the art.

DETAILED DESCRIPTION OF EXAMPLE EMBODIMENTS

Some example embodiments will be described in detail and clearly to such an extent that one (hereinafter referred to as an "ordinary one") skilled in the art to which the present disclosure belongs readily implements the present invention.

Figure 1:
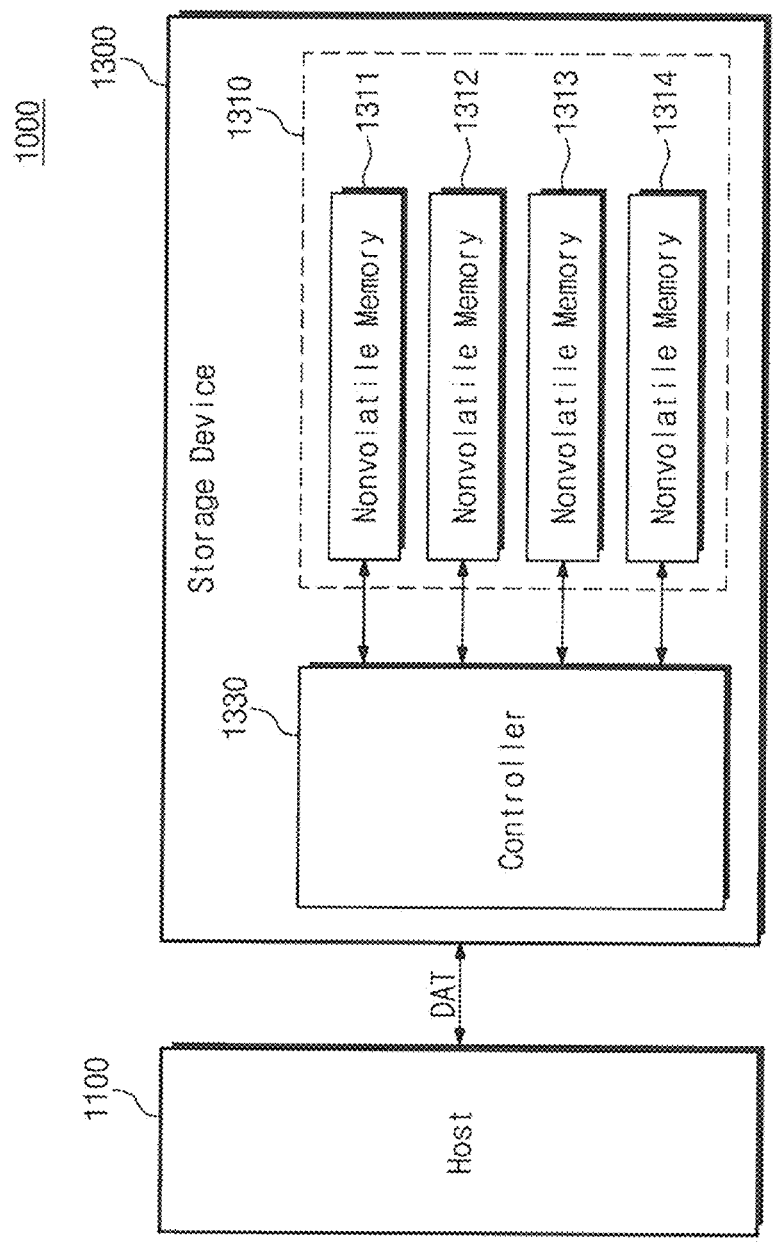
FIG. 1 is a block diagram illustrating a storage system which includes a storage device according to some example embodiments.

FIG. 1 is a block diagram illustrating a storage system which includes a storage device according to some example embodiments. A storage system 1000 may include a host 1100 and a storage device 1300.

The host 1100 may exchange data with the storage device 1300. The storage device 1300 may provide a storage service to the host 1100 in response to a command received from the host 1100.

For example, the host 1100 may provide the storage device 1300 with a write command and data DAT including write data. The storage device 1300 may store the requested write data included in the data DAT in response to the write command. For example, the host 1100 may provide a read command to the storage device 1300. The storage device 1300 may output data DAT including requested read data to the host 1100 in response to the read command.

For example, the host 1100 may be implemented to include at least one processor core. For example, the host 1100 may include a general-purpose processor, a special-purpose processor, or an application processor. The host 1100 may be a processor itself, or may be an electronic device or system including processor(s).

The storage device 1300 may include one or more nonvolatile memory devices 1310 and a controller 1330. FIG. 1 illustrates that the one or more nonvolatile memory devices 1310 includes four nonvolatile memory devices 1311, 1312, 1313 and 1314. However, FIG. 1 is provided to facilitate better understanding, and the present disclosure is not limited to FIG. 1. The number of nonvolatile memory devices included in the storage device 1300 may be variously changed or be modified.

Each of the nonvolatile memory devices 1311, 1312, 1313 and 1314 may store data requested by the host 1100. To this end, each of the nonvolatile memory devices 1311, 1312, 1313 and 1314 may include memory area(s) for storing data. For example, when each of the nonvolatile memory devices 1311, 1312, 1313 and 1314 includes a NAND-type flash memory, each of the nonvolatile memory devices 1311, 1312, 1313 and 1314 may include a memory cell array formed along a plurality of word lines and a plurality of bit lines.

However, the present disclosure is not limited to the above example, and each of the nonvolatile memory devices 1311, 1312, 1313 and 1314 may include one or more of various nonvolatile memory devices such as a phase-change random access memory (PRAM), a magneto-resistive RAM (MRAM), a resistive RAM (ReRAM), a ferro-electric RAM (FRAM), and/or the like. A configuration of each of the nonvolatile memory devices 1311, 1312, 1313 and 1314 may be variously changed or modified.

The controller 1330 may control an overall operation of the storage device 1300. For example, the controller 1330 may schedule operations of the nonvolatile memory devices 1311, 1312, 1313 and 1314, or may encode and decode signals/data processed in the storage device 1300. For example, according to control of the controller 1330, data requested by the host 1100 may be stored in the nonvolatile memory devices 1311, 1312, 1313 and 1314.

Each of the nonvolatile memory devices 1311, 1312, 1313 and 1314 may output data requested by the host 1100. For example, a read operation may be performed on data stored in the nonvolatile memory devices 1311, 1312, 1313 and 1314, under control of the controller 1330. According to the read operation, data, requested by the host 1100 may be accessed. Data stored in the nonvolatile memory devices 1311, 1312, 1313 and 1314 may be provided to the host 1100 under control of the controller 1330.

For example, an internal, management operation (e.g., read reclaim, garbage collection, and/or the like) may be performed on data stored in the nonvolatile memory devices 1311, 1312, 1313 and 1314, under control of the controller 1330. Data requested by the controller 1330 may be accessed according to the internal management operation.

However, the above examples are provided to facilitate better understanding, and the present disclosure is not limited thereto. Data stored in the nonvolatile memory devices 1311, 1312, 1313 and 1314 may be accessed due to various other reasons. In the present disclosure, data which is accessed (e.g., stored, read, or modified) due, to any reason may be referred to as "target data".

The controller 1330 may include a hardware configuration, a software configuration, or a hybrid configuration thereof, to perform the above various operations and other operations to be described below. For example, the controller 1330 may include a special-purpose hardware circuit configured to perform a specific operation. In some embodiments, the controller 1330 may include at least one processor core which is capable of executing an instruction set of a program code configured to perform a specific operation.

For example, the host 1100 and the storage device 1300 may communicate with each other in compliance with at least one of various interface protocols such as universal serial bus (USB), small computer system interface (SCSI), peripheral component interconnect express (PCIe), mobile PCIe (M-PCIe), nonvolatile memory express (NVMe), advanced technology attachment (ATA), parallel ATA (PATA), serial ATA (SATA), serial attached SCSI (SAS), integrated drive electronics (IDE), universal flash storage (UFS), Firewire, and/or the like.

In some example embodiments, the storage system 1000 may be implemented in one single electronic device. For example, the storage system 1000 may be one of various electronic devices such as a home appliance, a desktop computer, a laptop computer, a tablet computer, a smart phone, a wearable device, a video game console, and/or the like, which include the host 1100 and the storage device 1300. In some example embodiments, the storage system 1000 may be implemented in a plurality of electronic devices. For example, the host 1100 and the storage device 1300 may be separate electronic devices, and may be locally or remotely connected to implement the electronic system 1000.

Figure 2:
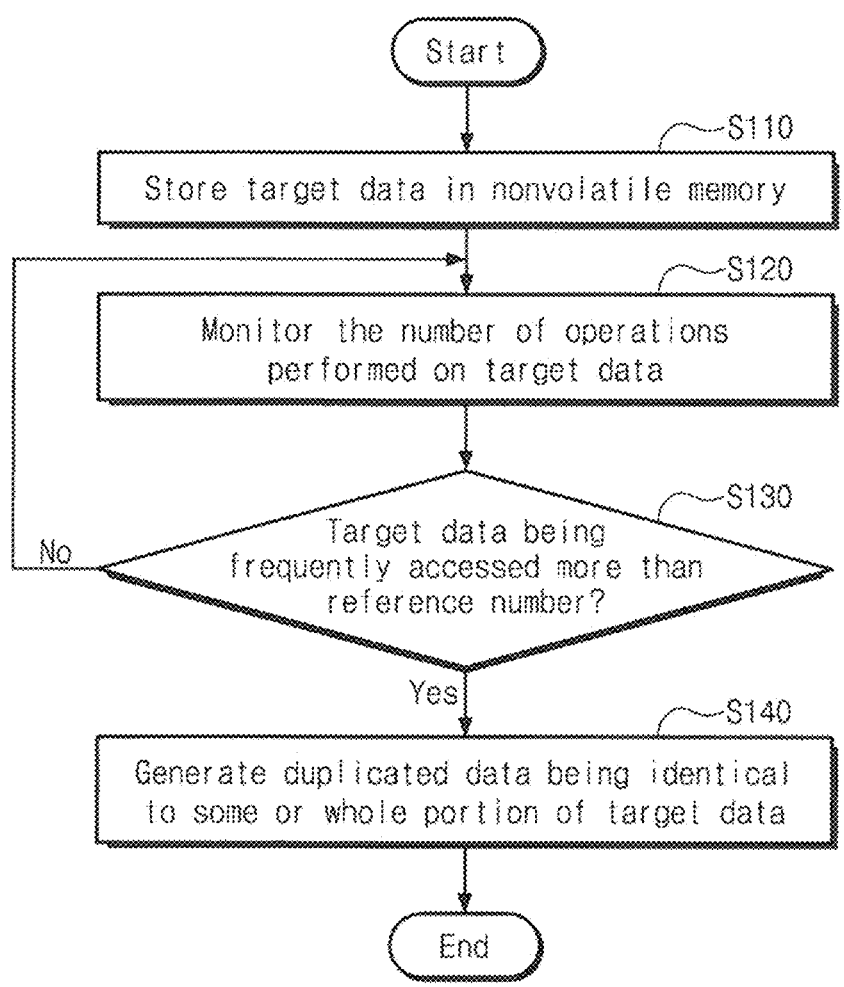
FIG. 2 is a flowchart illustrating an example operation of the storage device of FIG. 1.

FIG. 2 is a flowchart illustrating an example operation of the storage device of FIG. 1. For example, the example operation shown in FIG. 2 may start by inputting/outputting data to/from the storage device 1300 by an application (e.g., any type of application such as an operating system, a user application, and/or the like) executed on the host 1100.

In operation S110, the storage device 1300 may store target data in response to a request of the host 1100. The target data may be stored in the one or more nonvolatile memory devices 1310 according to control of the controller 1330. For example, the target data may be stored in a first memory area, of the one or more nonvolatile memory devices 1310.

Afterwards, the target data may be accessed due to various reasons. As the target data is accessed, various operations may be performed on the target data. For example, as the target data is read or modified, a read operation may be performed on the target data.

In operation S120, the controller 1330 may monitor the number of operations which are performed on the target data. For example, the target data may be read or modified in response to a request of the host 1100. For example, the controller 1330 may count the number of operations which are directed to the target data, and may manage an absolute count value. In some embodiments, the controller 1330 may count the number of operations which are performed on the target data during a reference time interval, and may manage a relative frequency value with respect to the reference time interval.

In operation S130, the controller 1330 may determine whether the target data is more frequently accessed than a predetermined reference value (i.e., whether the target data is so-called "hot data", which may mean that the data are more frequently accessed than a predetermined reference value). For example, the controller 1330 may determine whether the number of operations performed on the target data is equal to or greater than a reference value. For example, when the number of operations performed on the target data is equal to or greater than the reference value, it may be understood that the target data is frequently accessed. The reference value may be suitably selected such that the "hot data" is appropriately managed according to the example embodiments described in the present disclosure.

For example, operation S130 may be performed whenever a count value and/or a frequency value managed by the controller 1330 are changed. In some embodiments, operation S130 may be periodically performed, or may be performed when a specific condition is satisfied. Performing operation S130 may be variously changed or modified.

When the number of operations performed on the target, data is smaller than the reference value (i.e., when the target data is not frequently accessed), operation S120 may be performed. In operation S120, the controller 1330 may continuously monitor the number of operations which are performed on the target data. On the other hand, when the number of operations performed on the target data is equal to or greater than the reference value (i.e., when the target data is frequently accessed), operation S140 may be performed.

In operation S140, the controller 1330 may generate duplicated data. The duplicated data may be generated to be identical to some or all portions of the target data (in other words, the generated duplicated data may be the same as some or all portions of the target data). The duplicated data may be stored in the one or more nonvolatile memory devices 1310 under control of the controller 1330. For example, the duplicated data may be stored its a second memory area of the one or in other nonvolatile memory devices 1310. Storing the duplicated data will be further described with reference to FIGS. 3 to 4C.

When the target data is recognized as hot data, it may be required to process the target data fast. Meanwhile, the first memory area in which the target data is stored may be intensively accessed due to operations which are performed on the target data. When the first memory area is excessively accessed, the wearing level of the first memory area is increased and the reliability of the first memory area is deteriorated, and thus the data stored in the first area become subject to an error while during reading out the stored data.

Accordingly, in the example embodiments of the present disclosure, the controller 1330 may duplicate some or all portions of the target data which is recognized as hot data and may store the duplicated data in a second memory area of the memory device or in a different memory device. The target data and the duplicated data may be managed to access in parallel. For example, when the controller 1330 receives a read request for the target data from the host 1100, the controller 1330 may output the target data based on both the target data of the first memory area and the duplicated data of the second memory area, instead of being based on only the target data of the first memory area.

According to the example embodiments of the present disclosure, a second target data may be output based on both the target data and the duplicated data, and thus the second target data may be rapidly output and performance of the storage device 1300 may be improved. The second target data may be a sum of a portion of the target data and a portion of the duplicated data. The second target data may be identical to the target data. Furthermore, operations performed on the second target data may not be concentrated on the first memory area, and may be distributed to the first memory area and the second memory area. Thus, the number of operations (e.g., read operations) performed on the first memory area may decrease, and an error and failure due to read disturbance may be reduced. This may improve reliability of the storage device 1300, and may reduce or possibly prevent rapid deterioration of the lifespan of the one or more nonvolatile memory devices 1310.

The reference value may be selected depending, on various factors. When the reference value is too great, the first memory area in which the target data is stored may be excessively accessed and performance of the storage device 1300 may be degraded. On the contrary, when the reference value is too small, the duplicated data is generated too early and thus unnecessarily occupies the capacity of the one or more nonvolatile memory devices 1310. Moreover, the second memory area in which the duplicated data is stored may also be excessively accessed. Thus, the reference value may be balanced based on various factors such as performance of the storage device 1300, the lifespan of the one or more nonvolatile memory devices 1310, the storage capacity, and/or the like.

Figure 3:
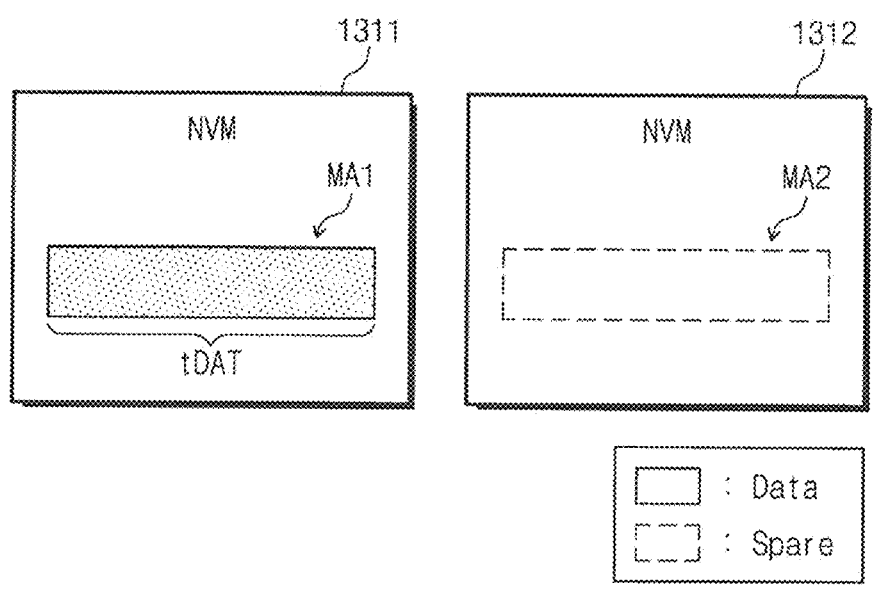
FIG. 3 is a diagram illustrating an example state of nonvolatile memory devices of FIG. 1.

FIG. 3 is a diagram illustrating an example state of the nonvolatile memory devices of FIG. 1.

For example, the one or more nonvolatile memory devices 1310 may include at least a nonvolatile memory 1311 and a nonvolatile memory 1312. In some example embodiments, the nonvolatile memory devices 1311 and 1312 may be implemented in different dies or chips and thus may be mounted on a printed circuit board (PCB) included in the storage device 1300. For example, the nonvolatile memory 1311 may include a first memory area MA1, and the nonvolatile memory 1312 may include a second memory area MA2.

For example, target data tDAT may be stored in the first memory area MA1 of the nonvolatile memory 1311 under control of the controller 1330 (operation S110 of FIG. 2).

Meanwhile, the second memory area MA2 of the nonvolatile memory 1312 may be a spare area, and may not store any data yet.

Figure 4A:
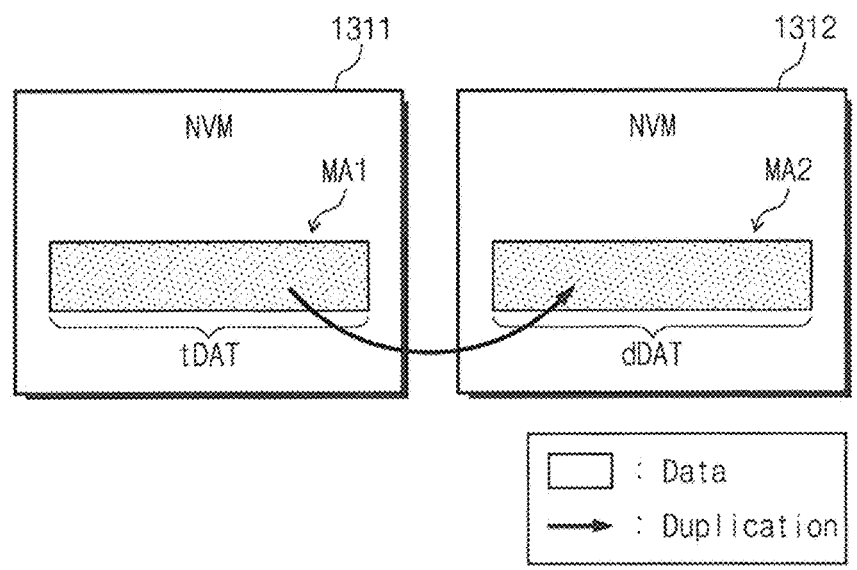
FIGS. 4A, 4B and 4C are diagrams illustrating storing process of the duplicated data according to the example operation of FIG. 2.
Figure 4B:
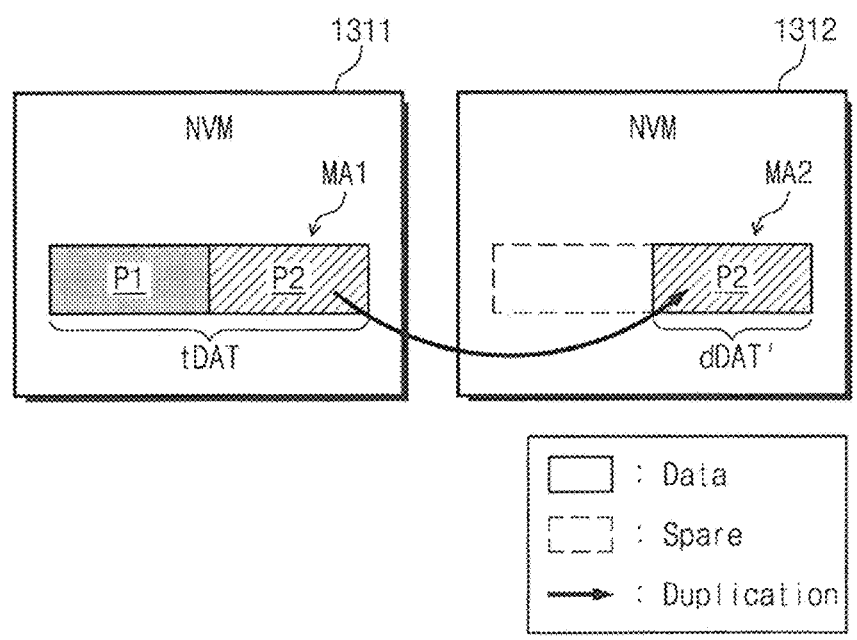
Figure 4C:
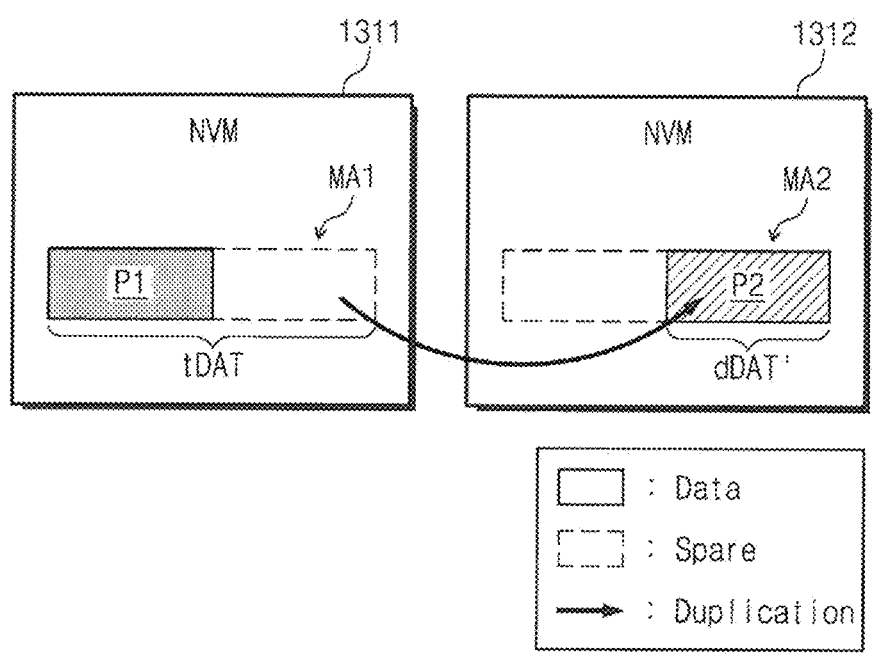

FIGS. 4A to 4C are diagrams illustrating processes of storing duplicated data according to the example operation of FIG. 2. FIG. 4A to FIG. 4C may be associated with operation S140 of FIG. 2, When the number of operations performed on the target data is equal to or greater than the reference value (i.e., when the target data is frequently accessed), the duplicated data may be generated.

Referring to FIG. 4A, duplicated data dDAT may be stored in a spare area (e.g., in the second memory area MA2 of the nonvolatile memory 1312) under control of the controller 1330. In the example of FIG. 4A, the duplicated data dDAT may be identical to all portions of the target data tDAT. That is, in some example embodiments, the controller 1330 may duplicate all portions of the target data tDAT to generate the duplicated data MAT. In some example embodiments, even if the duplicated data dDAT is stored in the second memory area MA2, the target data tDAT may be maintained in the first memory area MA1 (i.e., the target data tDAT may be "mirrored").

Referring to FIG. 4B, duplicated data dDAT' may be stored in a spare area (e.g., in the second memory area MA2 of the nonvolatile memory 1312) under control of the controller 1330. In the example of FIG. 4B, the duplicated data dDAT' may be identical to some portions of the target data tDAT. That is, in some example embodiments, the controller 1330 may duplicate some portions of the target data tDAT to generate the duplicated data dDAT'. In some example embodiments, even if the duplicated data dDAT is stored in the second memory area MA2, the target, data tDAT may be maintained in the first memory area MA1.

For example, the target data tDAT may include a first portion P1 and a second portion P2, and the first portion P1 may not overlap the second portion P2. For example, the duplicated data dDAT' may be generated to be identical to the second portion P2 of the target data tDAT. A data size of the first portion P1 and a data size of the second portion P2 may be variously changed or modified.

Referring to FIG. 4C, duplicated data dDAT' which is identical to some portions (e.g., the second portion P2) of the target data tDAT may be stored in a spare area (e.g., in the second memory area MA2 of the nonvolatile memory 1312) under control of the controller 1330. In some example embodiments, when the duplicated data dDAT' is stored in the second memory area MA2, the controller 1330 may invalidate the second portion P2 of the first memory area MA1 (i.e., the target data tDAT may be striped similar to that being used in redundant array of independent disk (RAID) scheme). Accordingly, the first memory area MA1 may maintain only the first portion P1 for the target data tDAT. In this example embodiment, the second portion P2 may be handled based on the duplicated data dDAT', which will be further described below.

The invalidation may be implemented in various manners. For example, the invalidation may mean that, some or all pieces of specific data is physically erased from a memory device. For another example, the invalidation may mean that mapping between a physical address and a logical address of some or all pieces of specific data is released such that the some or all pieces of the specific data is not recognized by the host 1100 (in this case, the some or all pieces of the specific data may not be physically erased from the memory device).

FIGS. 4A to 4C illustrate some examples for storing the duplicated data dDAT or dDAT'. However, the duplicated data may be generated according to other manners such that the duplicated data is identical to some or all portions of the target data tDAT, and the present disclosure is not limited to FIGS. 4A to 4C.

In the examples of FIGS. 4A to 4C, the nonvolatile memory 1312 storing the duplicated data dDAT or dDAT' may be different from the nonvolatile memory 1311 storing the target data tDAT. In some embodiments, the duplicated data dDAT or dDAT' may be stored in the same nonvolatile memory as that storing the target data tDAT. In this case, the duplicated data dDAT or dDAT' may be stored in a memory area (e.g., a memory block, a memory page, or the like) different from a memory area storing the target data tDAT. In some embodiments, the duplicated data dDAT or dDAT' may be distributively stored in a plurality of nonvolatile memory devices or a plurality of memory areas.

In the examples of FIGS. 4A to 4C, one duplicated data dDAT or dDAT' may be generated. However, in some embodiments, a plurality of pieces of duplicated data may be generated. The plurality of pieces of duplicated data may be stored in different nonvolatile memory devices respectively, or may be stored in the same nonvolatile memory. As the number of pieces of the duplicated data increases, performance and reliability may be improved, but the capacity of the one or more nonvolatile memory devices 1310 may be excessively occupied. Thus, the number of pieces of the duplicated data may be suitably selected based on various factors such as performance, reliability, capacity, and/or the like.

Figure 5:
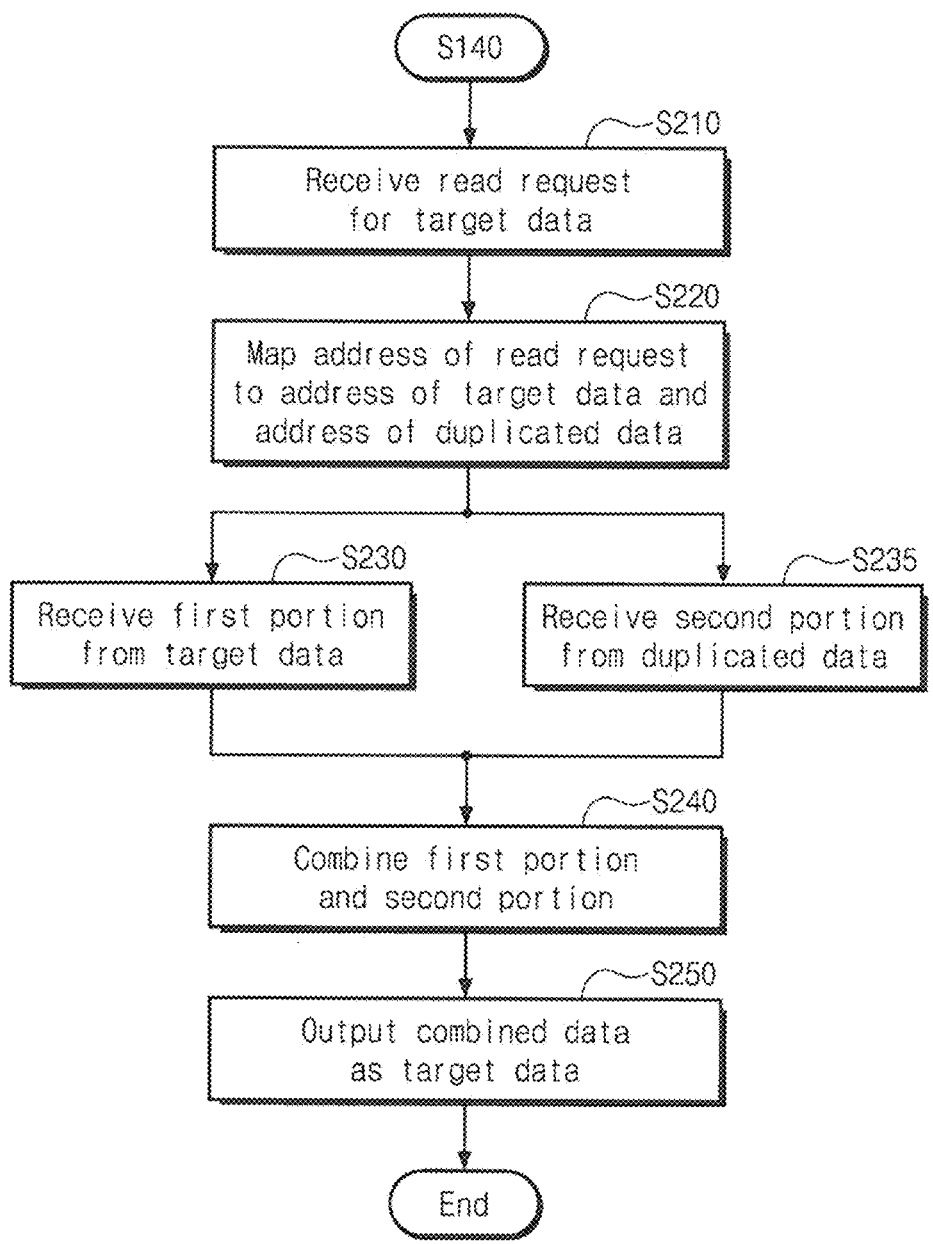
FIG. 5 is a flowchart illustrating an example operation of the storage device of FIG. 1.

FIG. 5 is a flowchart illustrating an example operation of the storage device of FIG. 1. For example, the example operation of FIG. 5 may start after the duplicated data of operation S140 of FIG. 2 is stored.

In operation S210, the controller 1330 may receive a read request for target data. The read request may be received from the host 1100, or may be generated inside the controller 1330.

In operation S220, the controller 1330 may perform address mapping. For example, when the storage device 1300 is a storage medium (e.g., a solid state drive (SSD), a secure digital (SD) card, an embedded multimedia card (eMMC), or the like including a NAND-type flash, memory, the controller 1330 may directly manage respective physical addresses for the one or more nonvolatile memory devices 1310. Meanwhile, the host 1100 may communicate with the storage device 1300 based on a logical address. In this example, the controller 1330 may manage a mapping relationship between the physical address and the logical address in association with specific data.

In the example embodiments of the present disclosure, duplicated data may be managed together with the target data. Thus, the controller 1330 may access both the target data and the duplicated data to process the read request for the target data. To this end, the controller 1330 may map an address included in the read request onto an address of a memory area nonvolatile memory in which the target data is stored and an address of a memory area of a nonvolatile memory in which the duplicated data is stored.

In operation S230, the controller 1330 may receive a first portion of the target data from the target data. In operation S235, the controller 1330 may receive a second portion of the target data from the duplicated data. Afterwards operation S240, the controller 1330 may combine the first portion received in operation S230 with the second portion received in operation S235 to generate combined data.

In operation S250, the controller 1330 may output the combined data as a final target data. Accordingly, when the number of operations performed on the target data is equal to or greater than the reference value, the controller 1330 may output the final target data based both the target data and the duplicated data.

Figure 6:
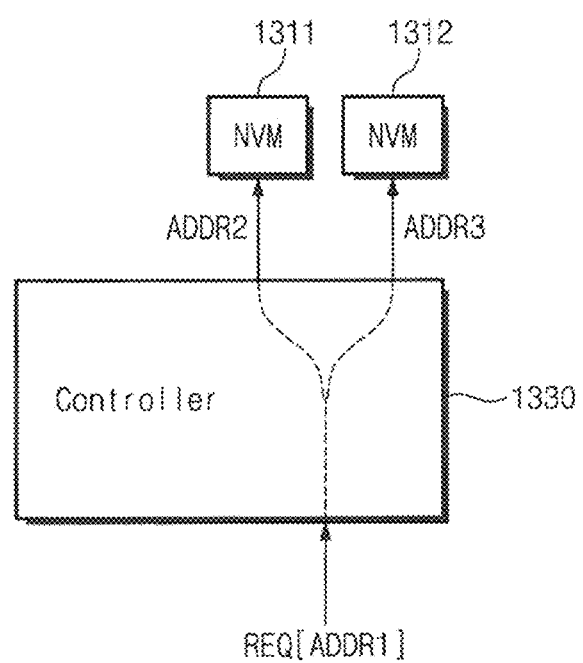
FIG. 6 is a diagram illustrating address mapping which is performed in the example operation of FIG. 5.

FIG. 6 is a diagram illustrating address mapping which is performed in the example operation of FIG. 5. FIG. 6 may be associated with operation S220 of FIG. 5.

For example, the controller 1330 may receive a read request REQ for the target data from the host 1100. The read request REQ may include an address ADDR1 (e.g., a logical address) which is recognized by the host 1100.

The controller 1330 may map the address ADDR1 onto an address ADDR2 and an address ADDR3. Each of the addresses ADDR2 and ADDR3 may include an address (e.g., a physical address) which is directly managed by the controller 1330. The address ADDR2 may be associated with an address of a memory area of the nonvolatile memory 1311 in which the target data is stored, and the address ADDR3 may be associated with an address of a memory area of the nonvolatile memory 1312 in which the duplicated data is stored.

The controller 1330 may map the address ADDR1 to both the addresses ADDR2 and ADDR3, to process the read request REQ. The target data of the nonvolatile memory 1311 may be accessed based on the address ADDR2, and the duplicated data of the nonvolatile memory 1312 may be accessed based on the address ADDR3. Thus, the target data may be read based on both the target data of the nonvolatile memory 1311 and the duplicated data of the nonvolatile memory 1312.

Figure 7A:
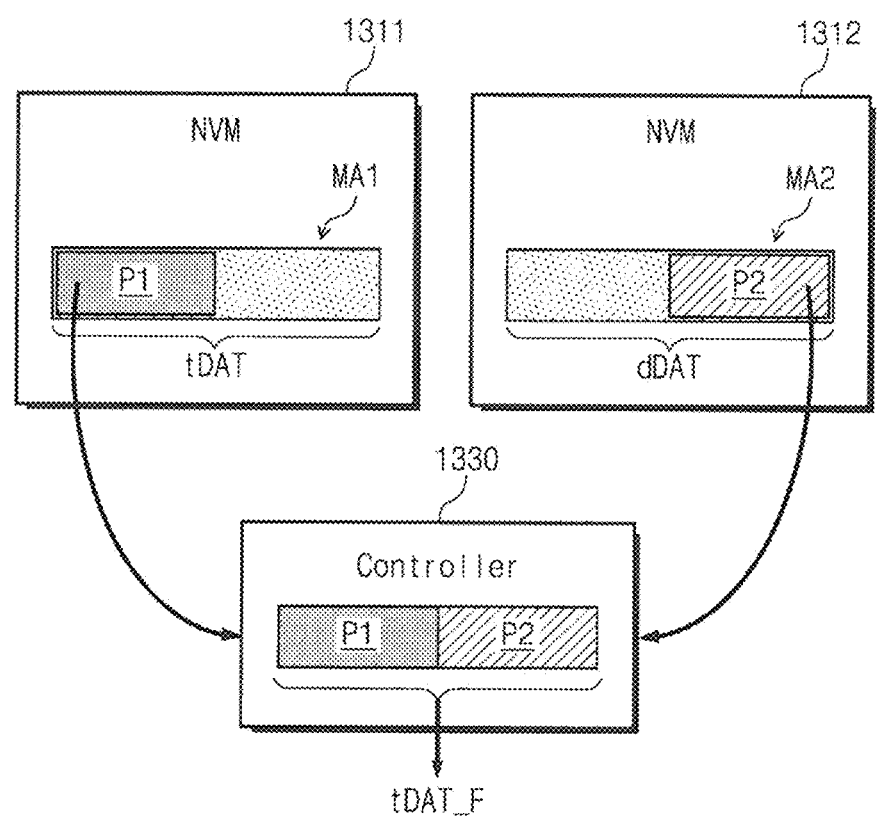
FIGS. 7A, 7B and 7C are diagrams illustrating outputting of the target data according to the example operation of FIG. 5.
Figure 7B:
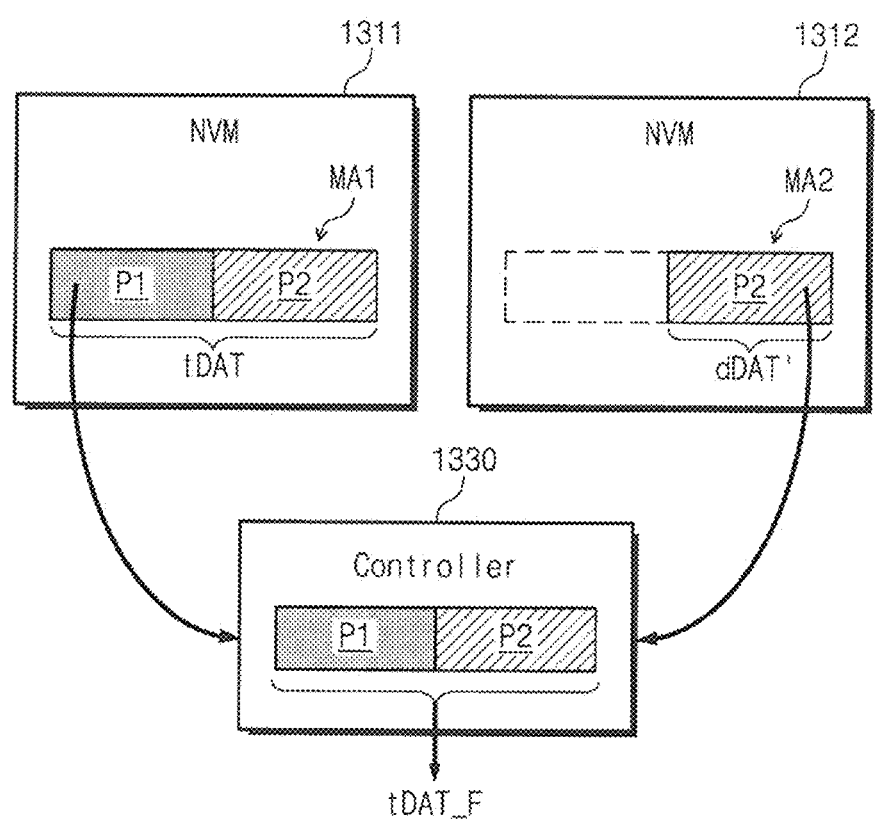
Figure 7C:
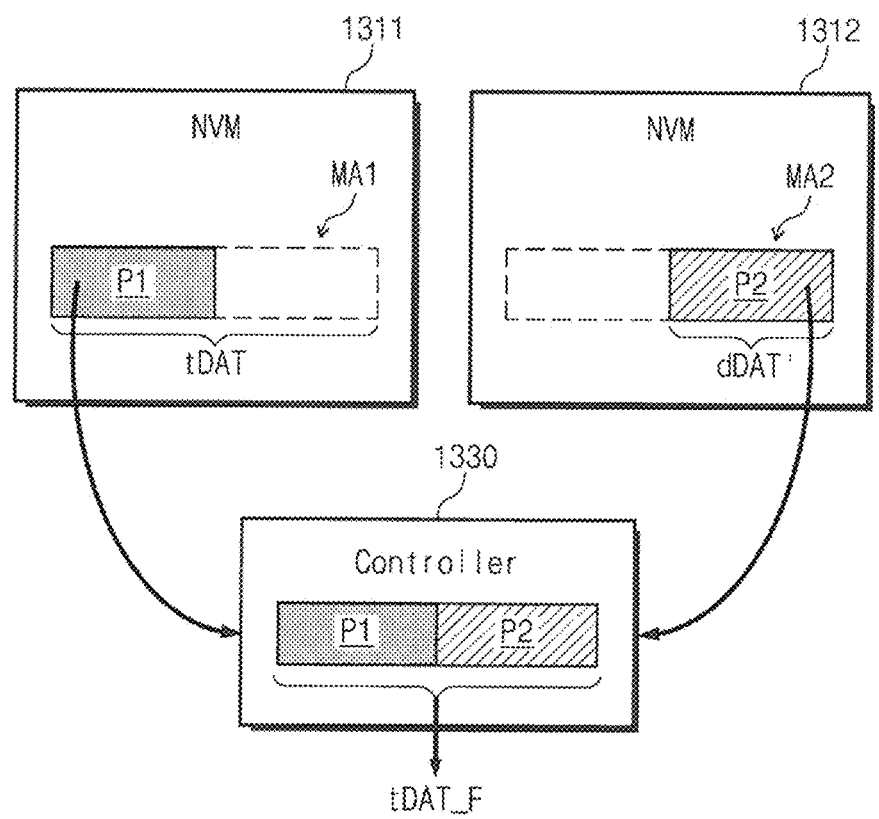

FIGS. 7A to 7C are diagrams illustrating processes of outputting the target data according to the example operation of FIG. 5. FIGS. 7A to 7C may be associated with operations S230 to operation S250 of FIG. 5.

FIG. 7A is associated with the target data tDAT and the duplicated data dDAT which are stored according to the example of FIG. 4A. Referring to FIG. 7A, the controller 1330 may receive the first portion P1 of the target data tDAT from the target data tDAT of the first memory area MA1, to output a first portion of the target data. Further, the controller 1330 may receive the second portion P2 of the target data tDAT from the duplicated data dDAT of the second memory area MA2, to output the final target data tDAT_F.

Afterwards, the controller 1330 may combine the first portion P1 and the second portion P2 to generate the combined data. The controller 1330 may output the combined data to the host 1100 as the final target data tDAT_F.

When the target data tDAT is frequently accessed, the controller 1330 may output the target data tDAT based on both the target data tDAT and the duplicated data dDAT. The first portion P1 of the target data tDAT is read from the nonvolatile memory 1311 and the second portion P2 of the target data tDAT is read from the nonvolatile memory 1312 in parallel, and thus the target data tDAT may be rapidly output. When the number of pieces of the duplicated data dDAT increases, speed of outputting the target data tDAT may become increased.

Moreover, even if the target data tDAT is frequently accessed, operations performed on the target data tDAT may not be concentrated on the first memory area MA1 of the nonvolatile memory 1311, but may be distributed to the first memory area MA1 of the nonvolatile memory 1311 and the second memory area MA2 of the nonvolatile memory 1312. Accordingly, the number of operations performed in the first memory area MA1 may decrease, and the lifespan deterioration of the nonvolatile memory 1311 may be reduced.

A data size/location of the first portion P1 and a data size/location of the second portion P2 may be fixed or be variable. For example, the data size/location of the first portion P1 and the data size/location of the second portion P2 may be predetermined by logic of the controller 1330. For another example, the data size/location of the first portion P1 and the data size/location of the second portion P2 may be statically or dynamically varied depending on various factors such as bandwidth, workload, a wear level, and/or the like, of each of the nonvolatile memory devices 1311 and 1312. When the data size/location of the first portion P1 and the data size/location of the second portion P2 are varied, the addresses ADDR2 and ADDR3 of FIG. 6 may also be varied.

FIG. 7B is associated with the target data tDAT and the duplicated data dDAT' which are stored according to the example shown in FIG. 4B. FIG. 7C is associated with the target data tDAT and the duplicated data dDAT' which are stored according to the example shown in FIG. 4C.

Referring to FIGS. 7B and 7C, the controller 1330 may receive the first portion P1 of the target data tDAT from the target data tDAT of the first memory area MA1, to output the final target data tDAT_F. Further, the controller 1330 may receive the second portion P2 of the target data tDAT from the duplicated data dDAT' of the second memory area MA2, to output the target data tDAT_F. Afterwards, the controller 1330 may combine the first portion P1 and the second portion P2 to, generate combined data. The controller 1330 may output the combined data to the host 1100 as the final target data tDAT_F.

Unlike the example of FIG. 7A, in the examples of FIGS. 7B and 7C, the second memory area MA2 may not store the first portion P1 or the second portion P2 of the first memory area MA1 may be invalidated. Thus, the controller 1330 may not flexibly adjust the data size/location of the first portion P1 and the data size/location of the second portion P2. However, if the capacity of a spare area is sufficient, full sized target data may be duplicated in the second portion.

In some example embodiments, a plurality of pieces of duplicated data may be generated. For example, the plurality of pieces of duplicated data, when they are combined, may be identical to corresponding portion of the target data tDAT as shown in FIG. 7A. Alternatively, the plurality of pieces of duplicated data, when they are combined, may not include some portions of the target data tDAT as shown in FIGS. 7B and 7C. In some embodiments, the plurality of pieces of duplicated data may not overlap one another. In this example embodiment, the controller 1330 may output the final target data tDAT_F based on all of the target data tDAT and the plurality of pieces of duplicated data.

Figure 8:
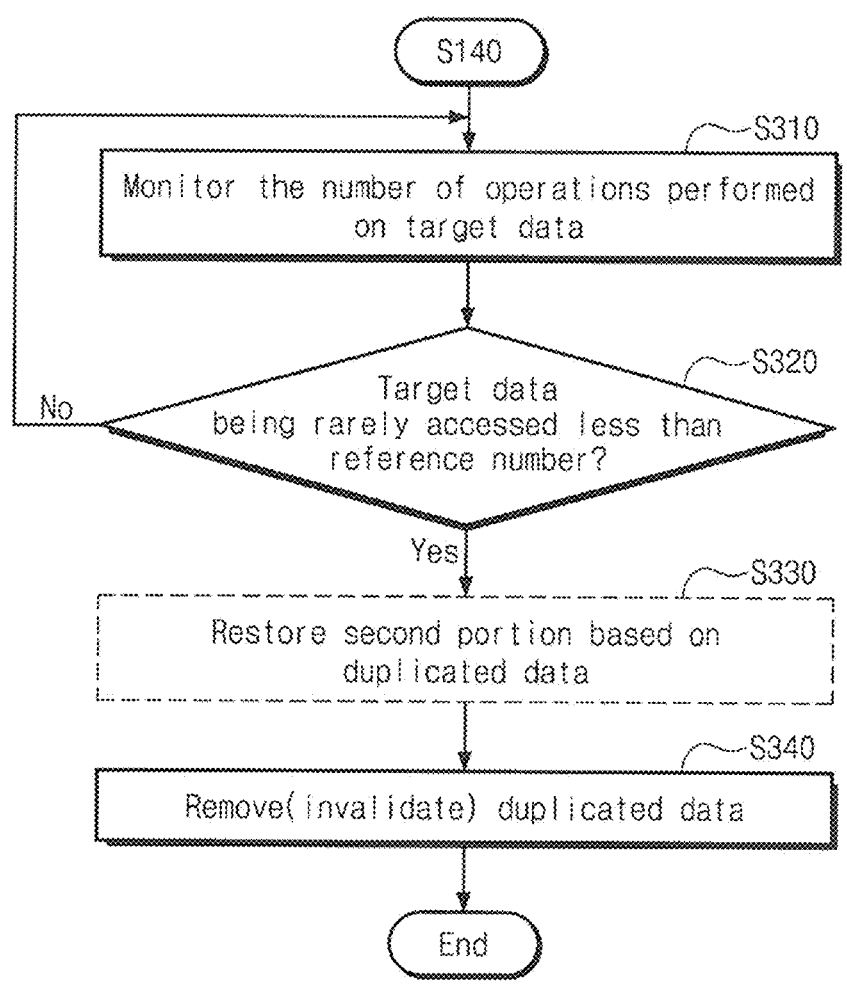
FIG. 8 is a flowchart illustrating an example operation of the storage device of FIG. 1.

FIG. 8 is a flowchart describing an example operation of the storage device of FIG. 1. The example operation of FIG. 8 may start after the duplicated data of operation S140 of FIG. 2 is stored.

In operation S310, the controller 1330 may monitor the number of operations which are performed on the stored target data and/or the duplicated data. Operation S310 may be similar to operation S120 of FIG. 2. However, since the example operation of FIG. 8 starts after the duplicated data is stored, in operation S310, the controller 1330 may count the number of operations which are directed to at least one of the target data and/or the duplicated data.

In operation S320, the controller 1330 may determine whether the target data is rarely accessed. When the target data are rarely accessed, they may be called as "cold data." For example, the controller 1330 may determine whether the number of operations performed on the target data and/or the duplicated data is equal to or smaller than a second reference value. For example, when the number of operations performed on the target data and/or the duplicated data is equal to or smaller than the second reference value, it may be understood that the target data is rarely accessed.

For example, operation S320 may be performed whenever a count value and/or a frequency value managed by the controller 1330 are changed. In some embodiments, operation S320 may be periodically performed, or may be performed when a specific condition is satisfied. Performing operation S320 may be variously changed or modified. Further, the second value shown in operation S320 may be the same as or different from the first reference value shown in operation S130 of FIG. 2. Those reference values may be changed or modified depending on design requirements of the storage device 1300.

When the number of operations performed on the target data and/or the duplicated data exceeds the second reference value when the target data is still frequently accessed), operation S310 may be performed. During operation S310, the controller 1330 may continuously monitor the number of operations which are performed on the target data and/or the duplicated data. When the number of operations performed on the target data and/or the duplicated data becomes equal to or smaller than the reference value (i.e., when the target data is rarely accessed), operation S330 or operation S340 may be performed.

In operation S330, the controller 1330 may restore the target data based on the duplicated data. Operation S330 may be performed when some portions of the target data has been invalidated, similar to that illustrated in FIG. 4C or 7C. For example, referring to FIG. 7C, the controller 1330 may restore the second portion P2 for the target data tDAT of the first memory area MA1 based on the duplicated data dDAT+.

The restoration may be implemented in various manners. For example, referring to FIG. 7C, when the second portion P2 is physically erased, the restoration may include duplicating the second portion P2 of the second memory area MA2 of the nonvolatile memory 1312 and storing the duplicated second portion P2 in the first memory area MA1 of the nonvolatile memory 1311. For another example, when the second portion P2 is not physically erased, the restoration may include re-mapping a physical address and a logical address which correspond to the second portion P2 of the first memory area MA1.

In operation S340, the controller 1330 may remove (or invalidate) the duplicated data. When the target data is rarely accessed, high performance may not be required. Further, operations performed on the target data may not be excessively performed. Thus, removing (or invalidating) the duplicated data may be acceptable.

After operation S340 (and operation S330) is performed, states of the nonvolatile memory devices 1311 and 1312 of FIGS. 4A to 4C may be restored to the state illustrated in FIG. 3. Thus, the nonvolatile memory 1312 may not store the duplicated data, and the nonvolatile memory 1311 may still store the target data tDAT.

After the duplicated data is removed (or invalidated), the storage device 1300 may operate based only on the target data without the duplicated data. For example, when the controller 1330 receives a following read request from the host 1100, the controller 1330 may read the target data only from the nonvolatile memory. Accordingly, the controller 1330 may output the target data based only on the target data without the duplicated data in response to the following read request.

Figure 9:
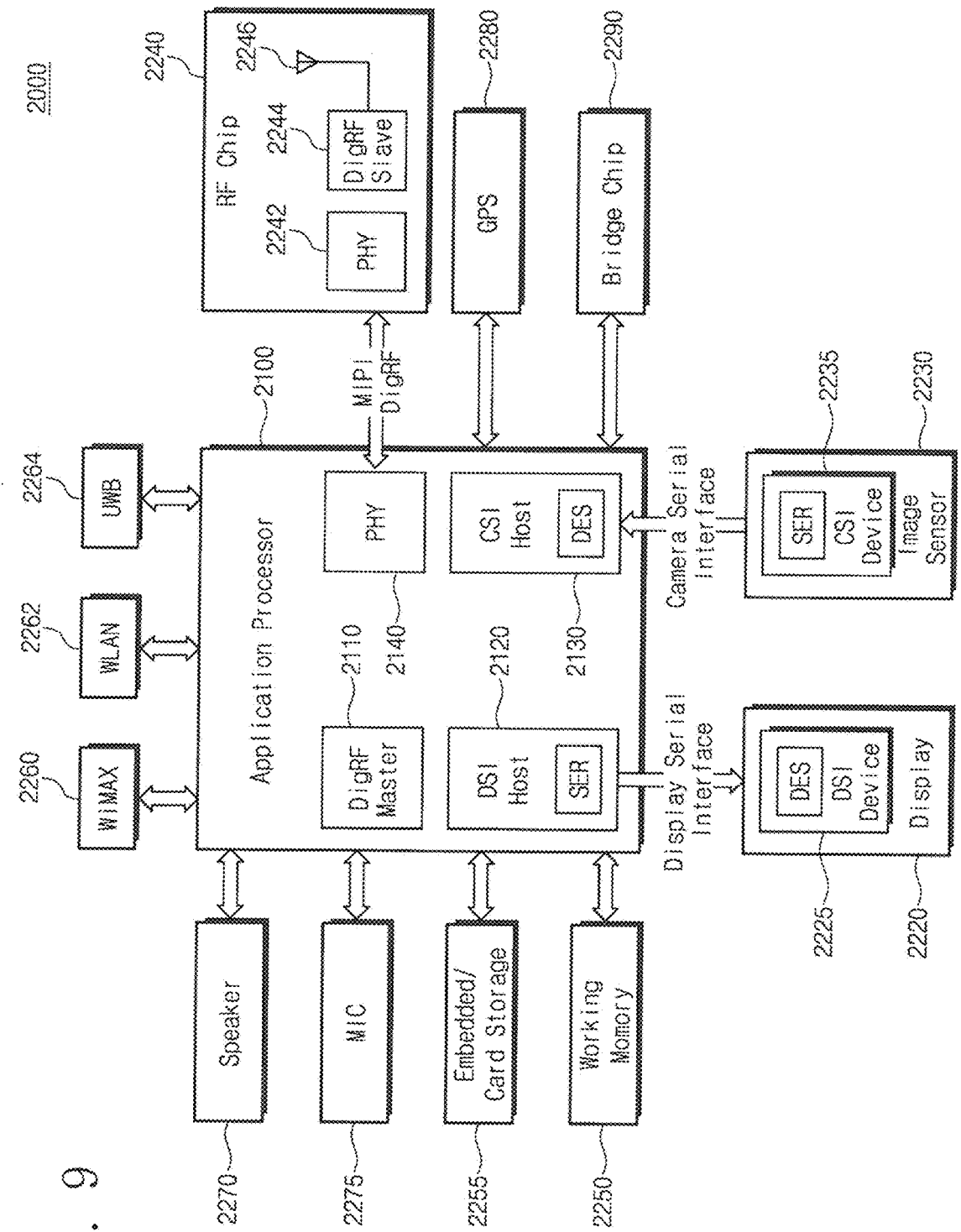
FIG. 9 is a block diagram illustrating a configuration of an electronic system which includes a storage device according to some example embodiments and interfaces thereof.

FIG. 9 is a block diagram illustrating a configuration of an electronic system which includes a storage device according to some example embodiments and interfaces thereof.

An electronic system 2000 may include an application processor 2100, a display 2220, and an image sensor 2230. The application processor 2100 may include a DigRF master 2110, a display serial interface (DSI) host 2120, a camera serial interface (CSI) host 2130, and a physical layer 2140.

The electronic system 2000 may further include a radio frequency (RF) chip 2240 which communicates with the application processor 2100. The RF chip 2240 may include a physical layer 2242, a DigRF slave 2244, and an antenna 2246. The physical layer 2242 of the RF chip 2240 may exchange data with the physical layer 2140 of the application processor 2100 in compliance with a DigRF interface proposed by the MIPI alliance.

The electronic system 2000 may further include a working memory 2250 and an embedded/card storage 2255. The working memory 2250 and the embedded/card storage 2255 may store data provided from the application processor 2100. The working memory 2250 and the embedded/card storage 2255 may provide data stored therein to the application processor 2100.

The working memory 2250 may temporarily store data processed or to be processed by the application processor 2100. The working memory 2250 may include a volatile memory such as SRAM, DRAM, SDRAM, or the like, and/or a nonvolatile memory such as PRAM, MRAM, ReRAM, FRAM, or the like.

Figure 10:
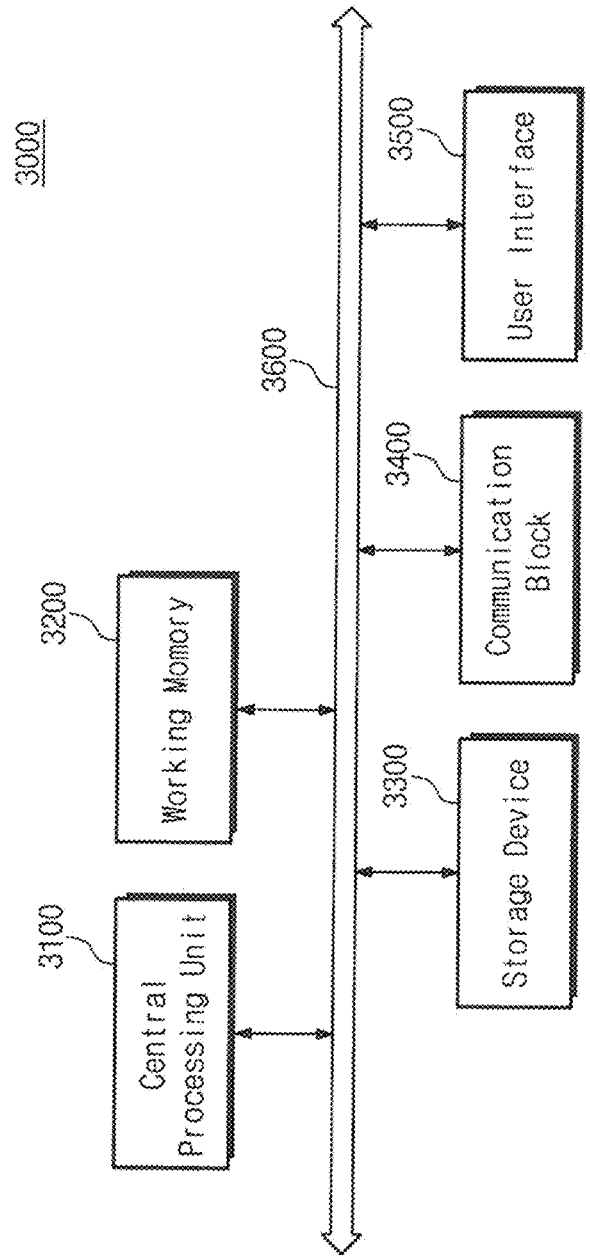
FIG. 10 is a block diagram illustrating a computing device which includes a storage device according to some example embodiments.

FIG. 10 is a block diagram illustrating a computing device which includes a storage device according to some example embodiments.

The computing device 3000 may include a central processing unit 3100, a working memory 3200, a storage device 3300, a communication block 3400, a user interface 3500, and a bus 3600. For example, the computing device 3000 may be one of electronic devices such as a desktop computer, a laptop computer, a workstation, a server, a video game console, an electronic vehicle, and/or the like.

Figure 11:
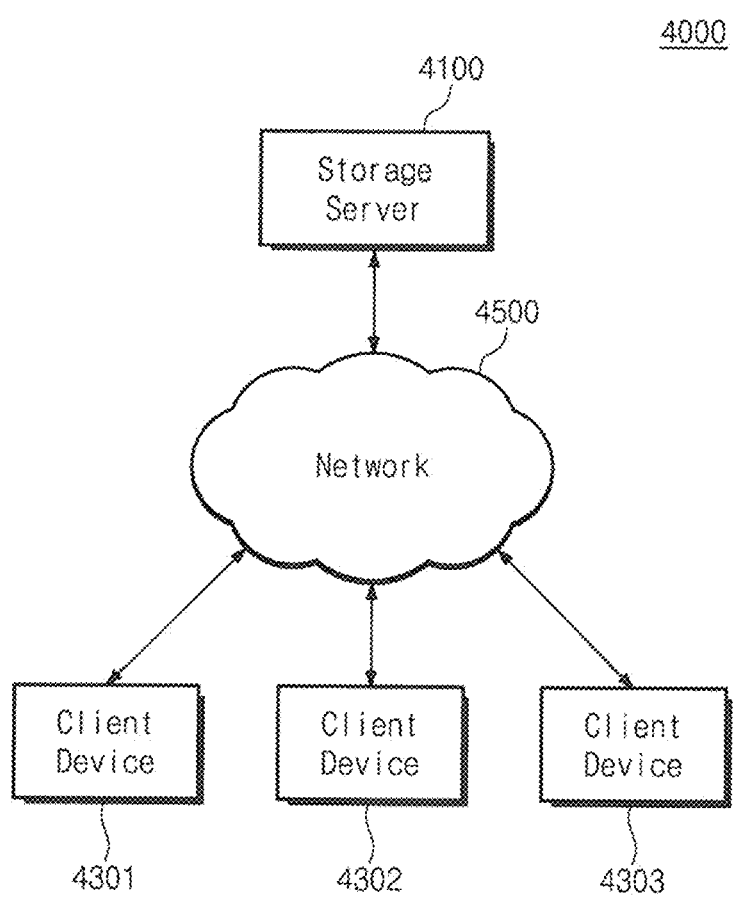
FIG. 11 is a block diagram illustrating a storage system which includes a storage device according to some example embodiments.

FIG. 11 is a block diagram illustrating a storage system which includes a storage device according to some example embodiments.

A storage system 4000 may include a storage server 4100 and client devices 4301, 4302 and 4303. For example, the storage server 4100 may communicate with the client devices 4301, 4302 and 4303 through a network 4500.

The storage server 4100 may provide a storage service for the client devices 4301, 4302 and 4303. For example, the storage server 4100 may be a device or a system, such as a database server or a cloud server, which is locally or remotely separated from the client devices 4301, 4302 and 4303.

The storage server 4100 may include one or more storage devices. Each storage device may include one or more nonvolatile memory devices and a controller. Thus, the storage server 4100 may be implemented according to the example embodiments of the present disclosure. When target data is frequently accessed in the storage server 4100, an access to the target data may be processed based on both the target data and duplicated data. Thus, operation performance may be improved, and the lifespan may not be rapidly shortened.

The above-disclosed subject matter is to be considered illustrative, and not restrictive, and the appended claims are intended to cover all such, modifications, enhancements, and other embodiments, which fall within the true spirit and scope of the inventive concept. Thus, to the maximum extent allowed by law, the scope is to be determined by the broadest permissible interpretation of the following claims and their equivalents, and shall not be restricted or limited by the foregoing detailed description.

What is claimed is:

1. A storage device comprising:
one or more nonvolatile memory devices including a first memory area configured to store target data; and
a controller,
wherein the controller is configured to:
monitor a number of operations which are performed on the target data;
store duplicated data in a second memory area of the one or more nonvolatile memory devices when the number of the operations is equal to or greater than a first reference value, the duplicated data being identical to some or all portions of the target data;
transmit a read request to the one or more nonvolatile memory devices to read out a first portion of the target data from the first memory area and a second portion of the duplicated data from the second memory area; and
combine the first portion of the target data from the first memory area and the second portion of the duplicated data from the second memory area to generate final target data, the final target data being identical to the target data,
wherein the one or more nonvolatile memory devices comprise a first nonvolatile memory and second nonvolatile memory, and
wherein the first nonvolatile memory includes the first memory area, and the second nonvolatile memory includes the second, memory area.

2. The storage device of claim 1, wherein the first nonvolatile memory and the second nonvolatile memory are implemented in different semiconductor dies or chips.

3. The storage device of claim 1, wherein when the second memory area stores the duplicated data, the first memory area maintains the target data.

4. The storage device of claim 3, wherein the controller is further configured to invalidate the duplicated data of the second memory area when the number of the operations becomes equal to or smaller than a second reference value after the second memory area stores the duplicated data.

5. The storage device of claim 4, wherein invalidating the duplicated data of the second memory area may be performed by physically erasing the duplicated data from the second memory area or releasing mapping between a physical address of the duplicated data and a logical address of the duplicated data.

6. The storage device of claim 5, wherein the controller is further configured to, when the number of the operations becomes equal to or smaller than the second reference value after the second memory area stores the duplicated data, restore the invalidated second portion of the first memory area based on the duplicated data of the second memory and invalidate the duplicated data of the second memory area.

7. The storage device of claim 1, wherein the first memory area and the second memory area are within a single nonvolatile memory device.

8. The storage device of claim 1, wherein the target data includes a first portion and a second portion which do not overlap each other, and
wherein the duplicated data corresponds to the second portion of the target data when the second memory area stores the duplicated data.

9. A storage device comprising:
one or more nonvolatile memory devices configured to store target data; and
a controller,
wherein the controller is configured to:
if the target data are more frequently accessed than a first reference value, output final target data in response to a read request for the target data based on both the target data and duplicated data when a number of operations which are performed on the target data is equal to or greater than the first reference value, the duplicated data being generated by identically duplicating some or all portions of the target data; and
if the target data are not more frequently accessed than the first reference value, output the final target data in response to a following read request for the target data based only on the target data.

10. The storage device of claim 9, wherein the controller is further configured to receive a first portion of the target data from the target data and receive a second portion of the target data from the duplicated data in response to the read request.

11. The storage device of claim 10, wherein the controller is further configured to:
combine the received first portion and the received second portion to generate combined data; and
output the combined data as the final target data.

12. The storage device of claim 9, wherein the controller is further configured to map a first address which is included in the read request onto a second address of the one or more nonvolatile memory devices and a third address of the one or more nonvolatile memory devices, the second address being associated with a memory location in which the target data is stored, the third address being associated with a memory location in which the duplicated data is stored.

13. The storage device of claim 9, wherein the one or more nonvolatile memory devices comprise a first memory area and a second memory area,
wherein the first memory area and the second memory area are included in different semiconductor dies or chips, and
wherein the first memory area stores the target data, and the second memory area stores the duplicated data.

14. The storage device of claim 9, wherein:
when the number of the operations is equal to or greater than the first reference value, the one or more nonvolatile memory devices store the duplicated data, and
when the number of the operations becomes equal to or smaller than a second reference value after the one or more nonvolatile memory devices store the duplicated data, the controller is configured to control invalidation of the duplicated data which is stored in the one or more nonvolatile memory devices.

15. A method of operating a nonvolatile memory device, the method comprising:
storing target data in a first memory area of the nonvolatile memory device;
evaluating a number of operations performed on the target data within a predetermined time, and if the number of the operations exceeds a first reference value, generating a duplicated data of at least a portion of the target data in a second memory area of the nonvolatile memory device;
upon receiving a read request from an external device, reading out a first portion of the target data from the first memory area and a second portion of the duplicated data from the second memory area;

combining the first portion of the target data from the first memory area and the second portion of the duplicated data from the second memory area to generate final target data, the final target data being identical to the target data; and transmitting the final target data to the external device.

16. The method of claim 15, wherein the first memory area and the second memory area are located in different nonvolatile memory devices.

17. The method of claim 15, wherein the method further includes:

evaluating a number of operations performed on the target data and the duplicated data after generating the duplicated data; and if the number of the operations performed on the target data and the duplicated data is smaller than a second reference value, invalidating the duplicated data.

18. The method of claim 17, wherein invalidating the duplicated data of the second memory area is performed by physically erasing the duplicated data from the second memory area or releasing mapping between a physical address of the duplicated data and a logical address of the duplicated data.

19. The method of claim 15, wherein the second memory area is a spare area of the nonvolatile memory device.

* * * * *